No. 719,611. PATENTED FEB. 3, 1903.
S. W. ROBINSON & C. H. TILTON.
ANGLE SHAFT COUPLING.
APPLICATION FILED MAY 23, 1902.
NO MODEL.
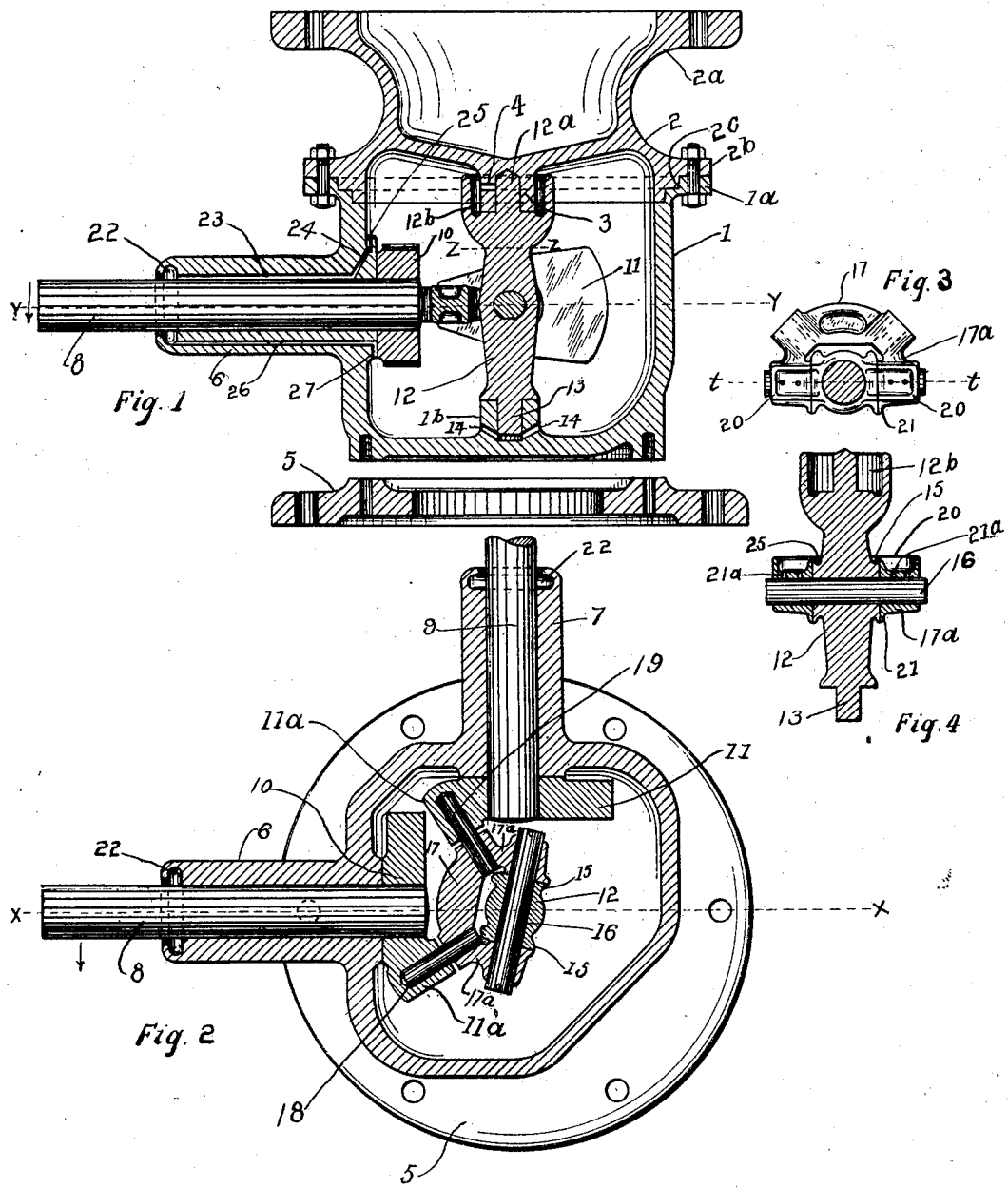

UNITED STATES PATENT OFFICE.

STILLMAN W. ROBINSON, OF COLUMBUS, OHIO, AND CHARLES H. TILTON, OF NEAR FREEPORT, MAINE.

ANGLE-SHAFT COUPLING.

SPECIFICATION forming part of Letters Patent No. 719,611, dated February 3, 1903.

Application filed May 23, 1902. Serial No. 108,738. (No model.)

*To all whom it may concern:*

Be it known that we, STILLMAN W. ROBINSON, residing at Columbus, in the county of Franklin and State of Ohio, and CHARLES H. TILTON, residing near Freeport, in the county of Androscoggin and State of Maine, citizens of the United States, have invented a certain new and useful Improvement in Angle-Shaft Couplings, of which the following is a specification.

Our invention relates to the improvement of angle-shaft couplings of that class which are adapted to communicate rotary motion from one shaft to another when said shafts are arranged at right angles with each other; and the objects of our invention are to provide a coupling of this class of improved construction and arrangement of parts, to so construct and arrange our improved coupling as to provide for the substantially noiseless transmission of motion from one shaft to another and without undesirable friction, to so construct our improved coupling as to insure a positive and easy operation of the parts, and to produce other improvements the details of which will be more fully pointed out hereinafter. These objects we accomplish in the manner illustrated in the accompanying drawings, in which—

Figure 1 is a central vertical section of our improved shaft-coupling on line $xx$ of Fig. 2. Fig. 2 is a transverse section on line $yy$ of Fig. 1. Fig. 3 is a detail section on line $zz$ of Fig. 1, and Fig. 4 is a sectional view on line $tt$ of Fig. 3.

Similar numerals refer to similar parts throughout the several views.

In carrying out our invention we employ a suitably-shaped casing-body, which is indicated at 1, said casing-body being provided with a top section 2, which is extended upward and flanged laterally to form an upper attaching bracket or support $2^a$. In forming the connection between this top or cap section 2 and body 1 we preferably provide the lower side of the outwardly-extending attaching-flange $2^b$ thereof with circular or step-like recesses $2^c$, arranged on different planes, which bear in correspondingly-shaped step-recesses of the upper outwardly-extending flange $1^a$ of the body 1, said flanges $2^b$ and $1^a$ being bolted together at desirable intervals. As indicated in the drawings, the under side of the cap or top portion 2 is so recessed as to form an upward extension of the interior or chamber of the casing-body, the upper side of said recessed portion inclining or tapering toward its central downwardly-extending socket projection 3, said socket projection having formed through its wall one or more oil-ports 4. The lower end of the casing-body 1 is designed to have bolted or otherwise secured thereto a suitable base-ring 5, which in Fig. 1 of the drawings is shown slightly detached from the casing. As indicated at 6 and 7, we form the casing with outwardly-extending horizontal tubular bearing or journal arms, which are arranged at right angles one with the other. These tubular arms are designed to form bearings for shafts 8 and 9, said shafts projecting inwardly within the body of the casing. The shaft 8 is connected at its inner end with the central portion of an arm 10, while the shaft 9 is similarly connected at its inner end with a corresponding arm 11. As shown more clearly in Fig. 1 of the drawings, each of these arms is of greater width and size toward one end thereof, and, as shown in Fig. 2, each of said arms has its smaller end portion turned slightly inward, as indicated at $11^a$.

12 represents a central vertical shaft or standard which at its upper end is enlarged and formed with a central pivot projection $12^a$, resulting in the formation of an annular recess $12^b$ about said pivot-pin, which receives the body of the socket projection 3 of the top section 2 when said pivot extension of the shaft 12 is in the central socket of said cap projection. It will be observed, however, that the recess $12^b$ is of such size as to result in the formation of an annular space or oil-cup about the socket projection 3. The lower end of the shaft or standard 12 is formed with a reduced pivot extension 13, which enters the central socket of a projection $1^b$, formed with the bottom of the casing 1. Leading through the base of the socket projection $1^b$ are inclined oil-ports 14, which connect through the medium of the lower end of the socket of said projection. At the center of the height of the standard or shaft 12 the latter is provided on opposite sides with boss-like projections 15, and through the body of the shaft and these projections passes a horizontally-disposed pin 16. Upon the outwardly-extending ends of the pin 16 are mounted to turn the side arms of a yoke 17. At the junctions of the side arms 17$^a$ of the yoke 17 and its body or arm connecting portions are formed diverging openings in which bear the inner converging end portions of outwardly-extending pins 18 and 19. The outwardly-extending portion of the pin 18 enters and bears in a socket formed in the inturned end portion 11$^a$ of the arm 10, while the corresponding outer portion of the pin 19 enters a similar socket in the end portion 11$^a$ of the arm 11. It will be observed by reference to the drawings that the axes of the pins 18 and 19 if continued inward would intersect the vertical center of the shaft 12, likewise the continued axes of the shafts 8 and 9.

By reference to Figs. 3 and 4 of the drawings it will be seen that the upper side of each of the side arms 17$^a$ of the yoke 17 has formed on the upper side of the portion thereof which is mounted on the pin 16 an upwardly-projecting marginal wall 20, which rises from the sides of said yoke-arm portion and extends across the outer end thereof. The inner ends of these journal portions of the yoke-arms are also enlarged, as indicated at 21, to provide increased faces or surfaces for contact with the projections 15 of the shaft, thus resulting on the upper side of each of the yoke-arms above the pin 16 in a cup-like oil-receiving depression, which communicates with the periphery of the pin through the medium of ports 21$^a$.

In the outer end portion of each of the journal or bearing arms 6 and 7 we provide a continuous internal oil recess or pocket 22. In the upper surface of the interior of each of these bearing-arms we provide a longitudinal groove 23, which extends from the recess 22 to a point within the wall of the casing 1, from which it is carried through said casing-wall on an incline, as indicated at 24, and connects with an upper side recess 25, formed in a slight inward extension of said bearing-arm. The lower portion of the oil pocket or recess 22 is connected through the medium of a passage 26 in the lower portion of the bearing-arm, with a downwardly-extending port 27 at the inner end of said arm which opens into the interior of the casing 1.

In order to illustrate the operation of our improved coupling, we will assume that the shaft 8 is turning in the direction of the arrows in Figs. 1 and 2 and that it is desired to contribute a corresponding rotation to the shaft 9. The movement in a circle thus imparted to the pin-carrying portion 11$^a$ of the arm 10 causes a downward and thence upward movement of the yoke 17, the latter swinging on the end portions of the pin 16 and resulting, in conjunction with the oscillating movement of the central shaft 12, in a rotation of the shaft 9, corresponding with that of the shaft 8 through the pin connection of the yoke and the shaft-arm 11. It is obvious that in the passage of the pin-carrying ends of the shaft-arms 10 and 11 in circular paths about the inner ends of their shafts and in the partial rotations or oscillation of the shaft 12 the yoke 17 will not only be subjected to a downward and upward swinging movement, but will be carried back and forth with said central shaft.

In utilizing our invention the casing may be partially filled with oil, and through the passage therethrough or contact therewith of the moving parts within said casing it is obvious that said parts will not only be subjected to the lubricating action of the oil, but that oil will be thrown against the under side of the casing-top, where, following the incline of the under surface of said top, a proportion of the oil will pass into the cup-like receptacle 12$^b$ at the head of the shaft 12, and through the port or ports 4 serve to lubricate the upper pivot of said shaft. The oil which descends on the shaft as a result of overflow from the receptacle 12$^b$ and otherwise will be carried downward on said shaft onto the boss-like projections 15, from which it will return over the enlargements 21 of the end portions of the yoke side arms and into the depressions formed by the walls 20 and thence through the ports 21$^a$ to the surface of the pin 16. It is obvious that a portion of the oil which is thrown against the upper interior walls of the casing may enter the pocket or recess 25, from which it will pass through the port 24 to the groove 23 and surface of the shaft 8 or 9. Reaching the internal recess 22 the oil may pass through the passage 26 27 to the body of oil contained in the casing 1.

In the manner described it will be seen that simple and effective oiling means are provided, which will serve to thoroughly lubricate the bearing parts of our improved coupling. From the construction and operation of said coupling device herein shown and described it will be observed that the same is simple and that the parts are so connected and arranged with relation to each other as to insure the transmission of a corresponding rotary motion from one shaft to another when the same are arranged at right angles with each other.

The invention herein described for shafts arranged at right angles applies to shafts arranged at other angles by so forming the parts as to be suitable for such angles.

Having now fully described our invention, what we claim, and desire to secure by Letters Patent, is—

1. In an angle-shaft coupling, the combination with two rotatable shafts and arms extending from said shafts, of a vertical pivoted shaft at right angles with the first-named shafts, a yoke pivoted to said vertical shaft at right angles with its axis, said yoke carrying two pins extending into projections carried on the first-named shafts, the axes of all of said shafts, arms and pins radiating from a common point.

2. In an angle-shaft coupling, the combination with a casing having journal-bearing arms extending therefrom at right angles, shafts in said bearings, and an arm on the inner ends of each of said shafts, of a vertical pivoted shaft 12 within the casing, a central pin fixed in said vertical shaft, a yoke having its arms pivotally connected with said central pin on opposite sides of said vertical shaft, and pins connecting said yoke with corresponding ends of said shaft-arms, said pins converging toward their inner ends and having their axes in the same plane as the axis of said central pin of said vertical shaft, substantially as specified.

3. In an angle-shaft coupling, the combination with a casing having journal-arms 6 and 7 projecting at right angles with each other, said casing having the under side of its top portion provided with a central socket projection toward which the under surface of said top inclines, and the bottom of said casing being provided with a pivot-socket, the walls of said socket portions having oil-ports, shafts 8 and 9 mounted in said bearing-arms and an arm on the inner end of each of said shafts, a central vertical shaft 12 having its upper end portion provided with a central pivot and with an annular recess about the latter, and having its lower end portion provided with a pivot extension and connections between said central shaft and the inner end arms of the shafts 8 and 9 whereby rotary motion is imparted from one to the other of said last-named shafts, substantially as specified.

4. In an angle-shaft coupling, the combination with a casing having bearing-arm projections 6 and 7 at right angles with each other and a shaft mounted to rotate in each of said bearing-arms, the inner end of each of said shafts carrying an arm, of a pivoted vertical shaft 12, a central pin on said vertical shaft, a yoke having its side arms pivoted on opposite sides of said shaft, each of said yoke side arms having a cup-like depression in its upper side which depressions communicate with the bearing-openings of said side arms through oil-ports, and pins connecting said yoke with corresponding ends of the inner end arms of the shafts 8 and 9, said pins being so inclined with relation to each other as to cause an extension of their axes to intersect said central pin on said vertical shaft 12, substantially as specified.

STILLMAN W. ROBINSON.
CHARLES H. TILTON.

Witnesses as to the signature of Stillman W. Robinson:
A. L. PHELPS,
C. C. SHEPHERD.

Witnesses as to the signature of Charles H. Tilton:
CHARLOTT P. TILTON,
Mrs. W. H. COFFIN.